US011948483B2

(12) United States Patent
Ohashi

(10) Patent No.: US 11,948,483 B2
(45) Date of Patent: Apr. 2, 2024

(54) IMAGE GENERATION APPARATUS AND IMAGE GENERATION METHOD

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/907,827

(22) PCT Filed: Mar. 17, 2020

(86) PCT No.: PCT/JP2020/011798
§ 371 (c)(1),
(2) Date: Aug. 29, 2022

(87) PCT Pub. No.: WO2021/186581
PCT Pub. Date: Sep. 23, 2021

(65) Prior Publication Data
US 2023/0118678 A1 Apr. 20, 2023

(51) Int. Cl.
*G09G 3/00* (2006.01)
*G09G 3/38* (2006.01)

(52) U.S. Cl.
CPC ............... *G09G 3/003* (2013.01); *G09G 3/38* (2013.01); *G09G 2320/0238* (2013.01);
(Continued)

(58) Field of Classification Search
CPC ........ G02B 27/017; G09G 3/003; G09G 3/38; G09G 2320/0238; G09G 2320/0242; G09G 2320/0686; G09G 2354/00
See application file for complete search history.

(56) References Cited

U.S. PATENT DOCUMENTS 9,311,751 B2 4/2016 Lamb
2011/0234631 A1* 9/2011 Kim ........................ G06T 15/60 345/632

(Continued)

FOREIGN PATENT DOCUMENTS

JP 2013517579 A 5/2013
JP 2015509230 A 3/2015

(Continued)

OTHER PUBLICATIONS

International Search Report for corresponding PCT Application No. PCT/JP2020/011798, 5 pages, dated Jun. 23, 2020.

(Continued)

*Primary Examiner* — Roy P Rabindranath
(74) *Attorney, Agent, or Firm* — Matthew B. Dernier, Esq.

(57) ABSTRACT

An image generation apparatus generates an image whose background region on which a virtual object appearing in the real space is not superimposed is drawn in a background color having a predetermined luminance so as to make a region of a shadow of the virtual object look relatively dark. A rendering section renders the shadow of the virtual object appearing in a mesh structure in the real space by rendering not only the virtual object but also the mesh structure in the real space. A pixel value conversion section heightens colors of all pixels such that the background region uniformly takes on a background color having a predetermined luminance. A shadow/background processing section identifies the region of the shadow of the virtual object, sets the background region other than the shadow to the background color, and sets the shadow region to a color whose luminance is equal to or lower than that of the background color.

7 Claims, 7 Drawing Sheets

(52) U.S. Cl.
CPC ............... *G09G 2320/0242* (2013.01); *G09G 2320/0686* (2013.01); *G09G 2354/00* (2013.01)

(56) References Cited

U.S. PATENT DOCUMENTS

| | | | | |
|---|---|---|---|---|
| 2013/0147826 | A1 | 6/2013 | Lamb | |
| 2015/0116354 | A1 | 4/2015 | Tomlin | |
| 2016/0125644 | A1 | 5/2016 | James | |
| 2018/0114359 | A1* | 4/2018 | Song ................ | H04N 21/42202 |
| 2020/0202161 | A1 | 6/2020 | Kondo | |
| 2021/0020141 | A1 | 1/2021 | Yuasa | |

FOREIGN PATENT DOCUMENTS

| | | | |
|---|---|---|---|
| JP | 2019004471 | A | 1/2019 |
| JP | 2019053423 | A | 4/2019 |
| JP | 2019152794 | A | 9/2019 |
| WO | 2019176577 | A1 | 9/2019 |

OTHER PUBLICATIONS

Notice of Reasons for Refusal for corresponding JP Application No. 2022-508679, 6 pages, dated Dec. 19, 2023.

* cited by examiner

IMAGE GENERATION APPARATUS AND IMAGE GENERATION METHOD

TECHNICAL FIELD

The present invention relates to an image generation technology.

BACKGROUND ART

It is common to display a VR (Virtual Reality) video image on a head-mounted display to suit a direction of a line of sight of a user wearing the head-mounted display. In a case where the head-mounted display is a non-transmissive display, the user does not see anything other than the video image displayed on the head-mounted display, which enhances a sense of immersion into a video image world.

Although the user wearing the non-transmissive head-mounted display is unable to directly see an outside world, an optically transmissive head-mounted display allows one to see a CG (Computer Graphics) image that is superimposed on the outside world, while, at the same time, seeing the outside world.

The optically transparent head-mounted display generates and displays an AR (Augmented Reality) video image by superimposing a virtual reality object generated by CG on the outside world. Unlike the virtual reality detached from a real world, an augmented reality video image is a video image obtained by augmenting the real world by the virtual object, which allows the user to experience the virtual world, while, at the same time, being conscious of connection with the real world.

SUMMARY

Technical Problems

Although a transmissive head-mounted display superimposes a CG image on the outside world, a black color of the CG image is treated as being transmissive. Despite an attempt to superimpose the black color, the black color becomes transmissive, which makes it impossible to draw and display a virtual object's shadow. In order to display the shadow, it is necessary to darken only a shadow region by reducing luminance thereof. However, although it is possible to uniformly shade an entire optical element of the transmissive head-mounted display by using a dimming element, it is not possible to partially shade only the shadow region. Even if a dimming element capable of partially changing a transmittance is realized, the dimming element located at an eyepiece position is intended to change the luminance at an eye's focal point, which prevents it from looking as if the luminance had decreased in the real world and makes it impossible to represent the virtual object's shadow falling on a real space.

The present invention has been made in light of the above problems, and it is an object thereof to provide an image generation technology capable of representing a virtual object's shadow superimposed on the real space.

Solution to Problems

In order to solve the above problem, an image generation apparatus of an aspect of the present invention is an image generation apparatus that generates an image to be displayed on a transmissive display, and when generating an image to be superimposed on a real space, the image generation apparatus generates an image whose background region on which a virtual object appearing in the real space is not superimposed is drawn in a background color having a predetermined luminance so as to make a region of a shadow of the virtual object look relatively dark.

Another aspect of the present invention is an image generation method. This method is an image generation method that generates an image to be displayed on a transmissive display, and when generating an image to be superimposed on a real space, the image generation method generates an image whose background region on which a virtual object appearing in the real space is not superimposed is drawn in a background color having a predetermined luminance so as to make a region of a shadow of the virtual object look relatively dark.

It should be noted that any combinations of the above components and conversions of expressions of the present invention between a method, an apparatus, a system, a computer program, a data structure, a recording medium, and the like are also effective as aspects of the present invention.

Advantageous Effect of Invention

According to the present invention, it is possible to represent a shadow of a virtual object superimposed on a real space.

DESCRIPTION OF EMBODIMENTS

Figure 1:
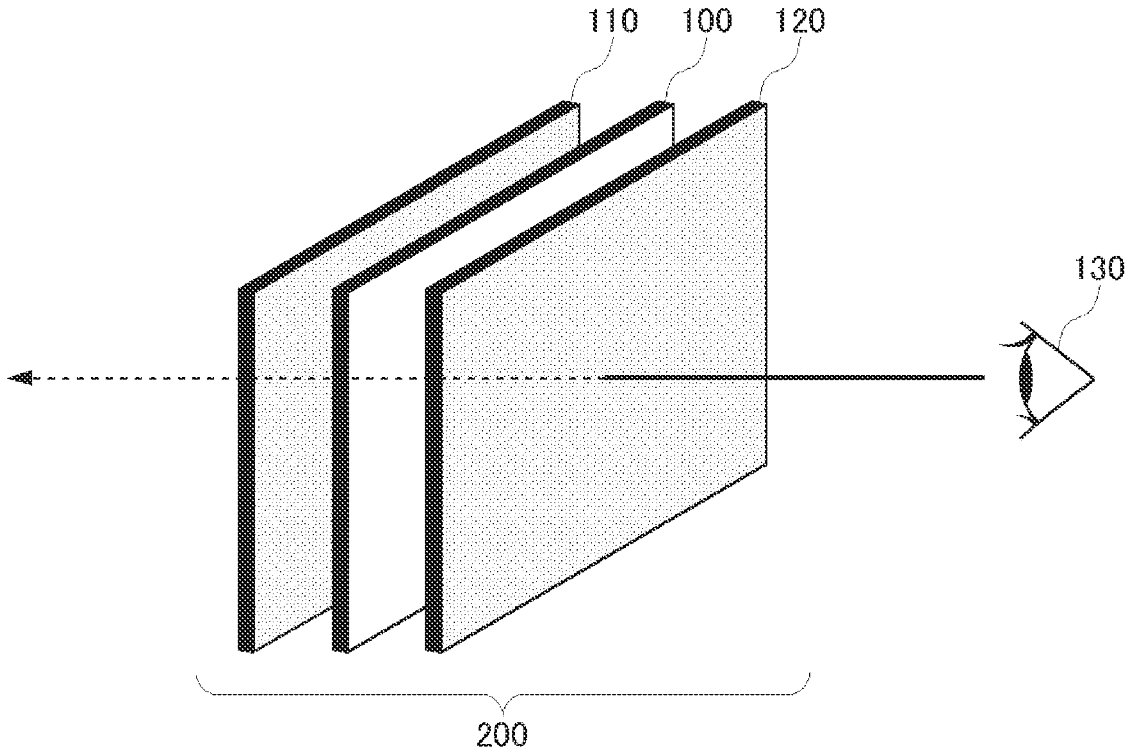
FIG. 1 is a configuration diagram of a transmissive display according to a first embodiment.

FIG. 1 is a configuration diagram of a transmissive display 100 according to a first embodiment.

A transmissive head-mounted display 200 is an example of a "wearable display." Although a generation method of an image to be displayed on the transmissive head-mounted display 200 will be described here, the image generation method of the present embodiment is applicable not only when one is wearing the transmissive head-mounted display 200 in a narrow sense but also when one is wearing eyeglasses, an eyeglass display, an eyeglass camera, headphones, headsets (headphones with a microphone), earphones, earrings, an ear-hook camera, a hat, a hat with a camera, a hair band, and the like.

The transmissive head-mounted display 200 includes the transmissive display 100, a first dimming element 110, and a second dimming element 120. As seen from a viewpoint 130, the first dimming element 110 is provided on an outside world's side of the transmissive display 100, and the second dimming element 120 is provided in the front of the transmissive display 100. A liquid crystal device, an electrochromic device, and the like are examples of the first dimming element 110 and the second dimming element 120.

The transmissive display 100 is an optical element that, while displaying a CG or other video image, allows one to optically see the outside world through the transmissive display 100 by use of a half mirror or the like.

The first dimming element 110 is provided to shield intense light from the outside world. When the transmissive head-mounted display 200 is used in such a bright place as outdoors, light is shielded by reducing the transmittance of the first dimming element 110. If it is supposed that the transmissive head-mounted display 200 is not used in an environment with intense external light, the first dimming element 110 is not an essential component.

The second dimming element 120 is provided to adjust the luminance of the CG image displayed on the transmissive display 100. As will be described later, the luminance of the transmissive display 100 is reduced by reducing the transmittance of the second dimming element 120 to heighten the luminance of the transmissive display 100 in whole and thereby represent a virtual object's shadow. If there is no problem with higher luminance of the background region, the second dimming element 120 is not an essential component.

The user sees the outside world through the first dimming element 110, the transmissive display 100, and the second dimming element 120 from the viewpoint 130.

Figure 2:
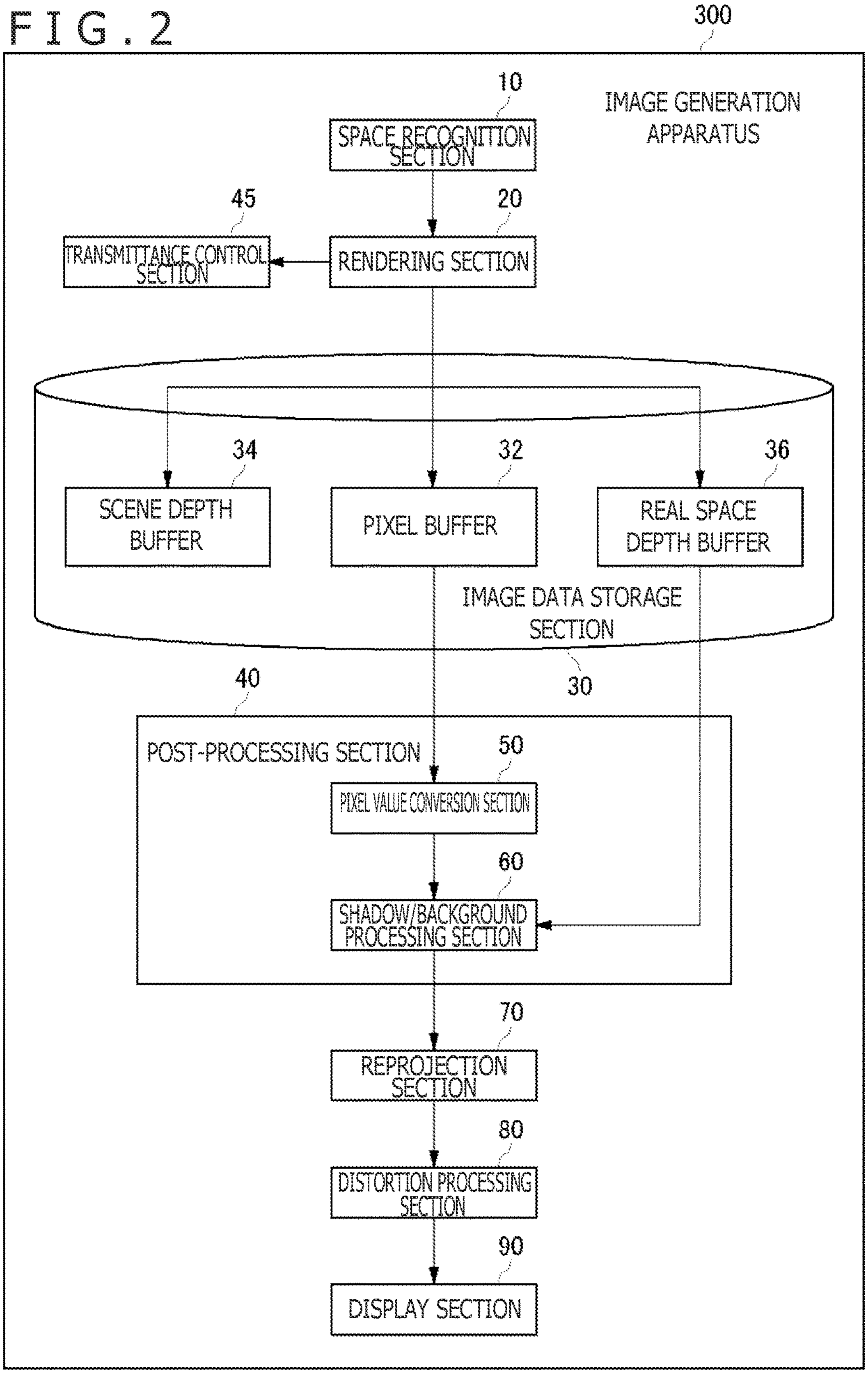
FIG. 2 is a configuration diagram of an image generation apparatus according to the first embodiment.

FIG. 2 is a configuration diagram of an image generation apparatus 300 according to the first embodiment. FIG. 2 illustrates a block diagram with focus on functions, and these functional blocks can be realized in various ways by hardware alone, by software alone, or a combination thereof.

The transmissive head-mounted display 200 is connected to the image generation apparatus 300 in a wireless or wired manner. The image generation apparatus 300 draws an image to be displayed on the transmissive head-mounted display 200 with reference to posture information of the transmissive head-mounted display 200 and transmits the image to the transmissive head-mounted display 200.

The components of the image generation apparatus 300 may be built into and integral with the transmissive head-mounted display 200. Alternatively, at least some of the components of the image generation apparatus 300 may be mounted on the transmissive head-mounted display 200. Also, at least some of the functions of the image generation apparatus 300 may be implemented in a server connected to the image generation apparatus 300 via a network.

A space recognition section 10 recognizes the real space of the outside world, models the real space with a polygon mesh structure, and supplies real-space mesh data to a rendering section 20. Shape information and depth information of objects in a real world are acquired by performing a 3D (three-dimensional) scan of the real-world space and spatially recognizing the real-world space. For example, it is possible to acquire depth information of the real space by use of a depth sensor that supports such schemes as an infrared pattern, Structure Light, and TOF (Time Of Flight) or to acquire depth information of the real space from parallax information of a stereo camera. As described above, the real space is subjected to a 3D scan and modeled with the polygon mesh structure in advance.

The rendering section 20 renders a shadow of the virtual object appearing in a mesh structure in the real space by rendering not only a virtual object in a virtual space but also the mesh structure in the real space generated by the space recognition section 10.

More specifically, the rendering section 20 not only renders the virtual object and stores a color value in a pixel buffer 32 but also renders the mesh structure in the real space, for example, with white (RGB (red, green, and blue) (255, 255, 255)) and stores the mesh structure in the pixel buffer 32. Although a color value is generated as a result of the rendering of the virtual object in the virtual space, no color information is generated even if a real object such as a wall, a floor, a ceiling or a still object in the real space is rendered, and the real object is drawn only in white.

Further, the rendering section 20 renders the shadow of the virtual object falling on the mesh structure in the real space, for example, in black (RGB (0, 0, 0)) or in a translucent color having an alpha value set and stores the shadow in the pixel buffer 32.

Another way of reflecting a shadow is to render the shadow by shadow mapping or ray tracing and superimpose only the shadow in a darker tone by post-processing or the like.

Although a virtual object's shadow has been cited as an example, various representations regarding light supplied by a virtual object to a real space are possible in addition to a shadow. The rendering section 20 draws, as translucent CG images, representations regarding light in the virtual space to the real space, and specifically, a virtual object's shadow falling on a real object and reflection of the virtual object into the real space, representation that makes what is behind an object in the virtual space that is located on the near side of the user visible therethrough, representation of lighting by a virtual light source in the virtual space, and the like. For example, it is possible to draw a shadow and reflection by use of a depth map projection method onto a plane from a light source in shadow mapping or a ray tracing technique. The superimposition of a translucent CG image of a virtual object's shadow and reflection thereof on the real space makes it possible to represent the virtual object's shadow and the reflection of the virtual object into the real space. Because an object in the real space is rendered only in white, it is possible to distinguish the object from a region where the shadow and reflection are drawn.

When rendering a virtual object in the virtual space and a polygon mesh in the real space, the rendering section 20 writes depth values of these objects to a scene depth buffer 34 and determines a front-to-back relation between the objects. No specific depth values are written to the scene depth buffer 34 for the pixels where no objects are drawn. Accordingly, the scene depth values are infinite (indefinite).

When rendering a mesh structure in the real space, the rendering section 20 writes a depth value to the corresponding pixel position of a real space depth buffer 36. Although there is a case where the rendering section 20 renders a shadow in a mesh structure in the real space, the rendering section 20 bears in mind in this case that a depth value has already been written to the corresponding pixel position of the real space depth buffer 36. A predetermined value such as '1' may be written to the real space depth buffer 36 rather than writing a depth value. In the real space depth buffer 36, a depth value or '1' is not written to the pixel positions where the mesh structure in the real space is not rendered. Accordingly, these pixel positions remain at their initial value (e.g., infinite or zero).

The reason that the real space depth buffer 36 is provided separately from the scene depth buffer 34 is to distinguish between the region where the real space is made transmissive in an as-is state with no virtual object superimposed thereon (referred to as a "background region") and the region where a virtual object is drawn.

A transmittance control section 45 controls the transmittances of the first dimming element 110 and the second dimming element 120 of the transmissive head-mounted display 200 as necessary. As will be described later, it is necessary to reduce the luminance of the transmissive display 100 of the transmissive head-mounted display 200 in whole to cause the background region where the real space is made transmissive in an as-is state with no virtual object superimposed thereon to shine in a gray background color such that the shadow of the virtual object looks relatively dark. For this reason, the transmittance control section 45 makes an adjustment to reduce the transmittance of the second dimming element 120 such that the background region looks as if it were not emitting light.

Because the luminance, gradation, and sharpness of the transmissive display 100 are sacrificed by the reduction of the transmittance of the second dimming element 120, the transmittance control section 45 makes the second dimming element 120 completely transmissive in a case where it is not necessary to represent a shadow.

The transmittance control section 45 may dynamically change the transmittance of the second dimming element 120 with reference to a dynamic range of the luminance of the CG image generated by the rendering section 20. In a case where the luminance of the background color is increased to make the shadow look dark, the transmittance control section 45 may make an adjustment to reduce the transmittance of the second dimming element 120 to suit the increase in luminance of the background color.

Also, in a case where the image generation apparatus 300 is used in a place severely affected by external light such as outdoors, the transmittance control section 45 makes an adjustment to reduce the transmittance of the first dimming element 110 to suit intensity of the external light and thereby shields light so as to make the CG image displayed on the transmissive display 100 easier to see.

Further, the transmittance control section 45 may adjust the transmittance of the first dimming element 110 to suit the transmittance of the second dimming element 120. In a case where the shadow is darkened by reducing the transmittance of the second dimming element 120, it is possible to introduce more external light by increasing the transmittance of the first dimming element 110.

A post-processing section 40 performs a process of displaying the shadow of the virtual object on drawing data regarding the virtual space and the real space generated by the rendering section 20.

A pixel value conversion section 50 heightens the color values of all the pixels stored in the pixel buffer 32 by use of the following formula such that the color of the background region (referred to as the "background color") where the real space is made transmissive in an as-is state with no virtual object superimposed thereon becomes gray (RGB (20, 20, 20), for example) and then stores a post-conversion color value of each pixel in the pixel buffer 32:

$$RGB' = RGB*(255-20)/255+20$$

where RGB is the original value of each of the RGB colors of the respective pixels, and RGB' is the post-conversion value of each of the RGB colors. This conversion makes it possible to heighten the color values in whole by (20, 20, 20) by reducing the gradation by scaling, while, at the same time, leaving white (RGB (255, 255, 255)) as white in an as-is state.

A shadow/background processing section 60 performs, with reference to the real space depth buffer 36, processes of not only identifying the shadow region of the virtual object and overwriting the shadow region in black (RGB (0, 0, 0)) but also identifying the background region other than the shadow and filling the region in the background color (RGB (20, 20, 20)).

The shadow region is identified in the following manner. First, the real space is drawn in the region for which a depth value or '1' is written to the real space depth buffer 36. Accordingly, there is a possibility that the shadow of the virtual object may appear in the region. The real space region where no shadow appears is drawn in white. For this reason, the region for which a depth value or '1' is written to the real space depth buffer 36 and whose color is not white is identified as the shadow. The shadow/background processing section 60 overwrites the region identified as the shadow in black (RGB (0, 0, 0)) and makes that region transmissive. The color of the shadow need only be equal to or lower than the background color (RGB (20, 20, 20)). Accordingly, the shadow color is not limited to black (RGB (0, 0, 0)) and may be adjusted to between (RGB (20, 20, 20)) and (RGB (0, 0, 0)). Also, a border of the shadow may be anti-aliased.

The region for which a depth value or '1' is written to the real space depth buffer 36 and which is not the shadow is the background region, and nothing is superimposed thereon. Accordingly, the region is overwritten with the background color (RGB (20, 20, 20)). This causes the background region to shine weakly as a whole, and consequently, the transmissive shadow region looks relatively dark. As a result, it looks as if the shadow of the virtual object appeared in the real space.

The post-processing section 40 may perform post-processing to make the CG image look natural and smooth by performing, in addition to the above, post-processing such as depth-of-field adjustment, tone mapping, and anti-aliasing.

A reprojection section 70 performs a reprojection process on the CG image that has been subjected to post-processing and converts the CG image into an image visible from the latest viewpoint position and direction of a line of sight of the transmissive head-mounted display 200.

A description regarding reprojection will be given here. In a case where the transmissive head-mounted display 200 has a head-tracking function and generates a virtual reality video image by changing the viewpoint and direction of the line of sight of the transmissive head-mounted display 200 in conjunction with movement of the user's head, a discrepancy occurs between an orientation of the user's head used as a precondition at the time of generation of a virtual reality video image and the orientation of the user's head at the time of display of the video image on the transmissive head-mounted display 200 due to a delay between the generation of the video image and the display of the virtual reality, which may cause the user to feel a sickening sensation (referred, for example, to as "virtual reality sickness").

For this reason, a process referred to as "time warp" or "reprojection" is performed to correct the rendered image to suit the latest position and posture of the transmissive head-mounted display 200, which makes it less likely for a person to perceive the discrepancy.

A distortion processing section 86 performs a process of distorting the CG image that has been subjected to the reprojection process to suit the distortion that occurs in an optical system of the transmissive head-mounted display 200 and supplies the CG image that has been subjected to the distortion process to a display section 90.

The display section 90 transmits the generated CG image to the transmissive head-mounted display 200 to cause the transmissive head-mounted display 200 to display the CG image.

The CG image provided by the display section 90 is displayed on the transmissive display 100 of the transmissive head-mounted display 200 and superimposed on the real space. This makes it possible for the user to see an augmented reality image in which the CG image is superimposed on part of the real space.

A description regarding the image generation method of the present embodiment will be given with reference to examples in FIGS. 3, 4A, 4B, 5A, and 5B.

Figure 3:
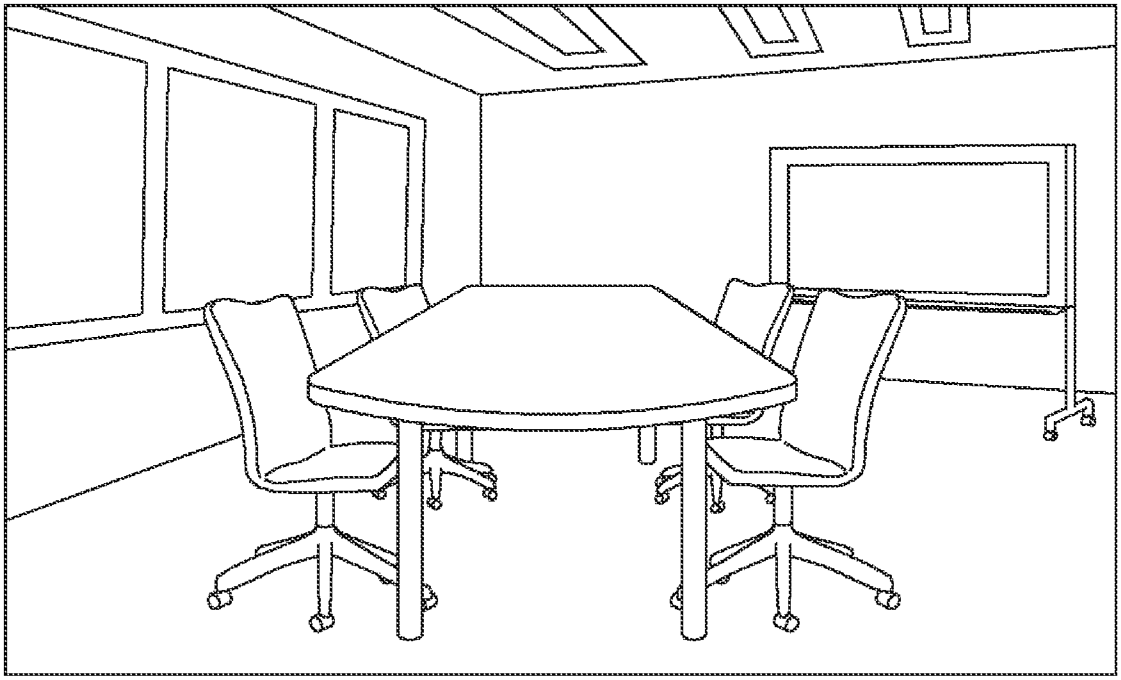
FIG. 3 is a diagram illustrating a real space of an outside world visible through a transmissive head-mounted display.

FIG. 3 is a diagram illustrating a real space of an outside world visible through the transmissive head-mounted display 200. A table, chairs, and a white board are provided in a conference room with windows. The space recognition section 10 generates polygon mesh data by spatially recognizing this real space.

Figure 4A:
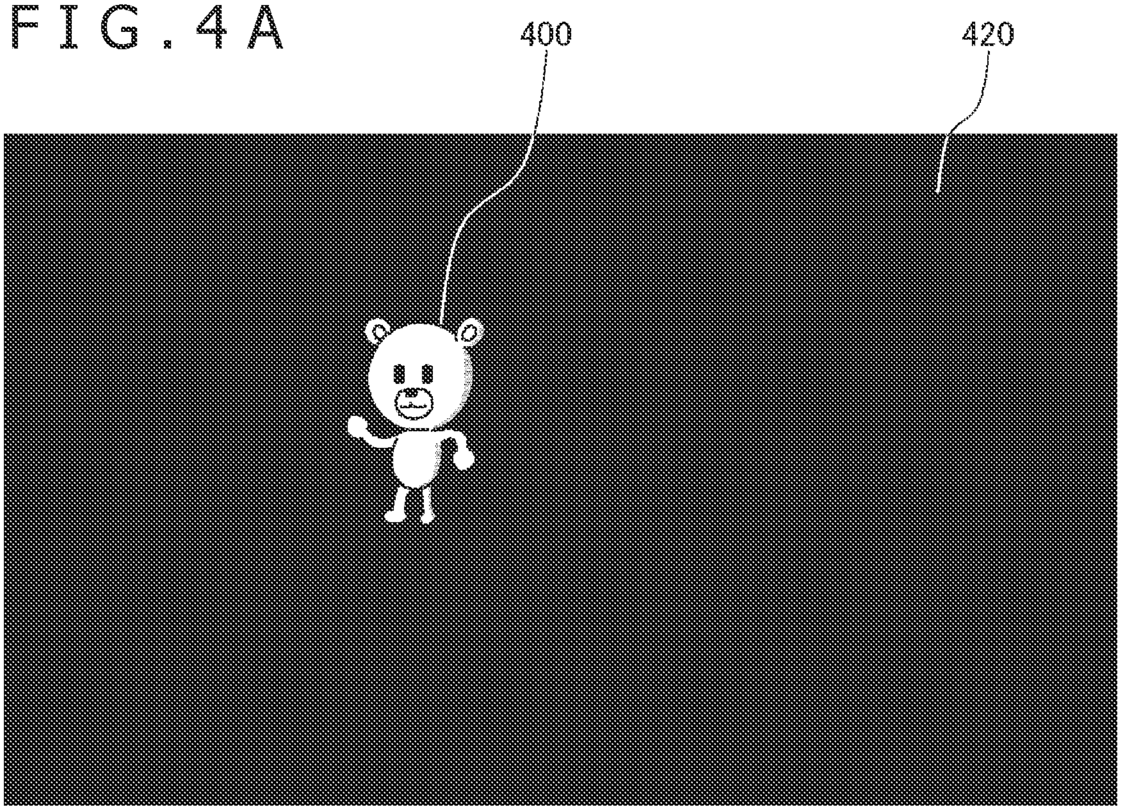
FIG. 4A is a diagram illustrating a virtual object 400 in a virtual space rendered by a conventional technique.

FIG. 4A is a diagram illustrating a virtual object 400 in a virtual space rendered by a conventional technique. Here, a case where no shadow is attached to the virtual object 400 is illustrated for comparison. A background region 420 where the virtual object 400 is not present is filled in black, and when displayed on the transmissive display 100, the black background region 420 is made transmissive, which makes the real space visible therethrough in an as-is state.

Figure 4B:
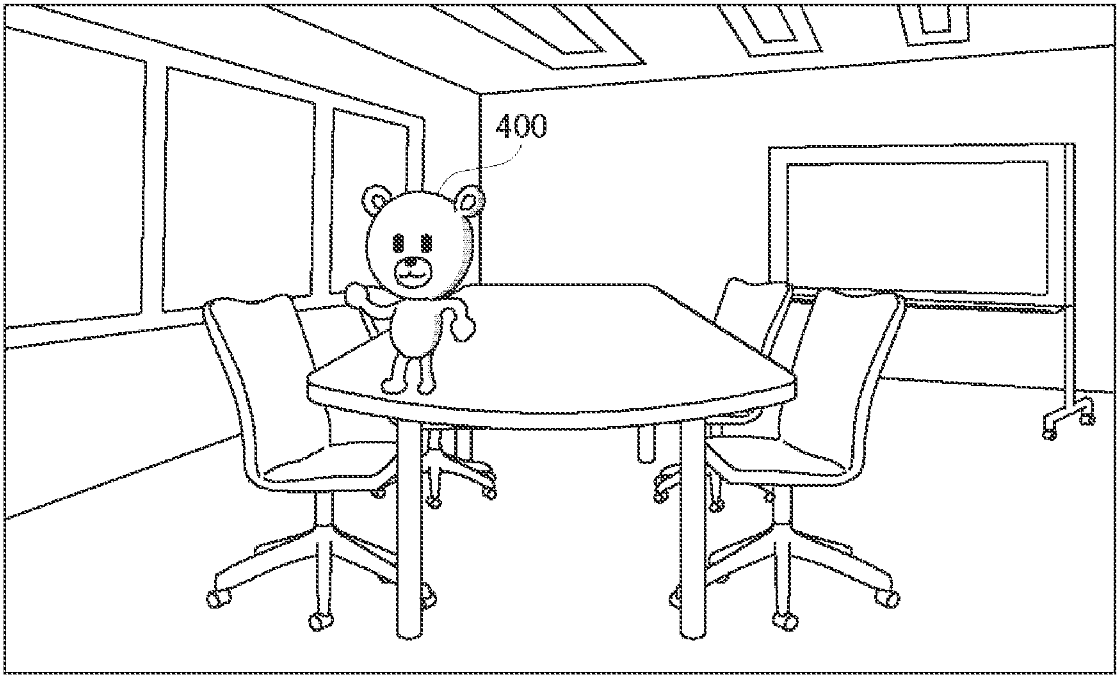
FIG. 4B is a diagram illustrating a manner in which the virtual object 400 is superimposed by the conventional technique on the real space that is made transmissive.

FIG. 4B is a diagram illustrating a manner in which the virtual object 400 is superimposed by the conventional technique on the real space that is made transmissive.

In the conventional technique, the rendered virtual object 400 is superimposed on the real space, and the background region is made transmissive, which makes the real space visible in an as-is state. This leads to artificiality as if the virtual object 400 were detached from and independent of the real space.

Figure 5A:
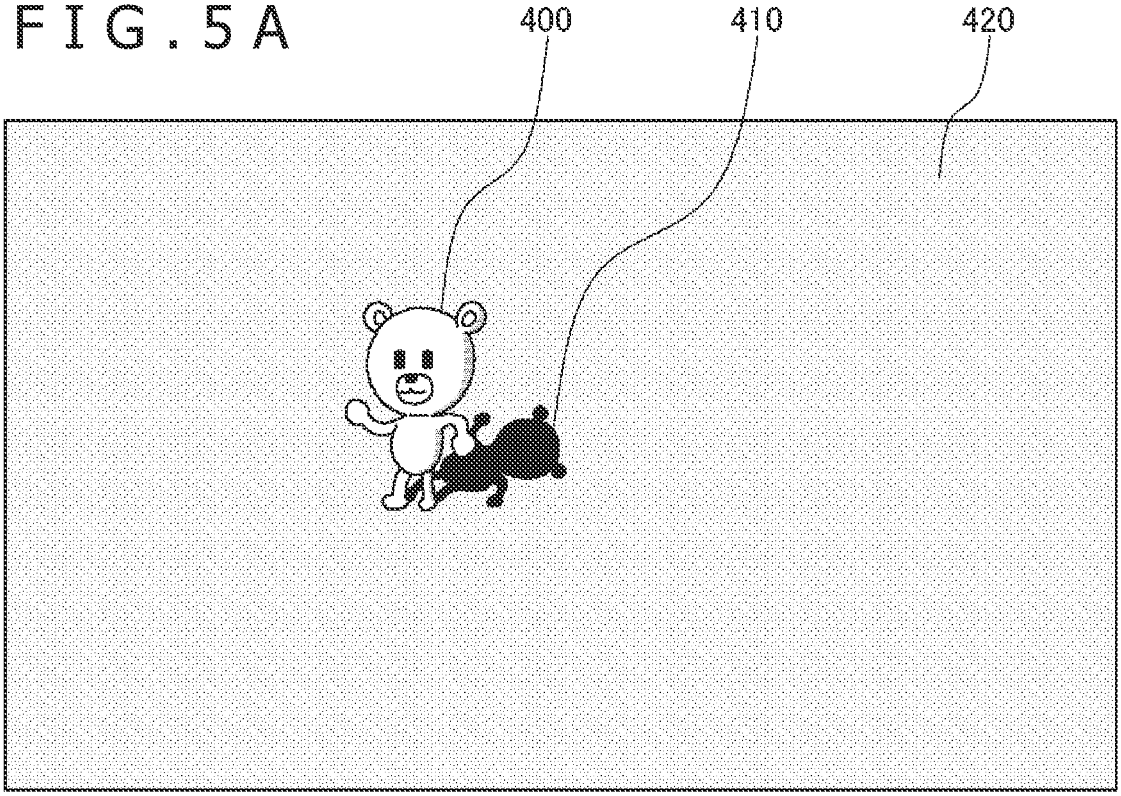
FIG. 5A is a diagram illustrating the virtual object 400 rendered by an image generation method of the present embodiment.

FIG. 5A is a diagram illustrating the virtual object 400 rendered by the image generation method of the present embodiment.

In the present embodiment, the rendering section 20 renders not only the virtual object 400 but also the mesh structure in the virtual space in white and a shadow 410 of the virtual object appearing in the mesh structure in the real space in black. The pixel value conversion section 50 fills the background region 420 other than the shadow 410 of the virtual object 400 in gray.

Figure 5B:
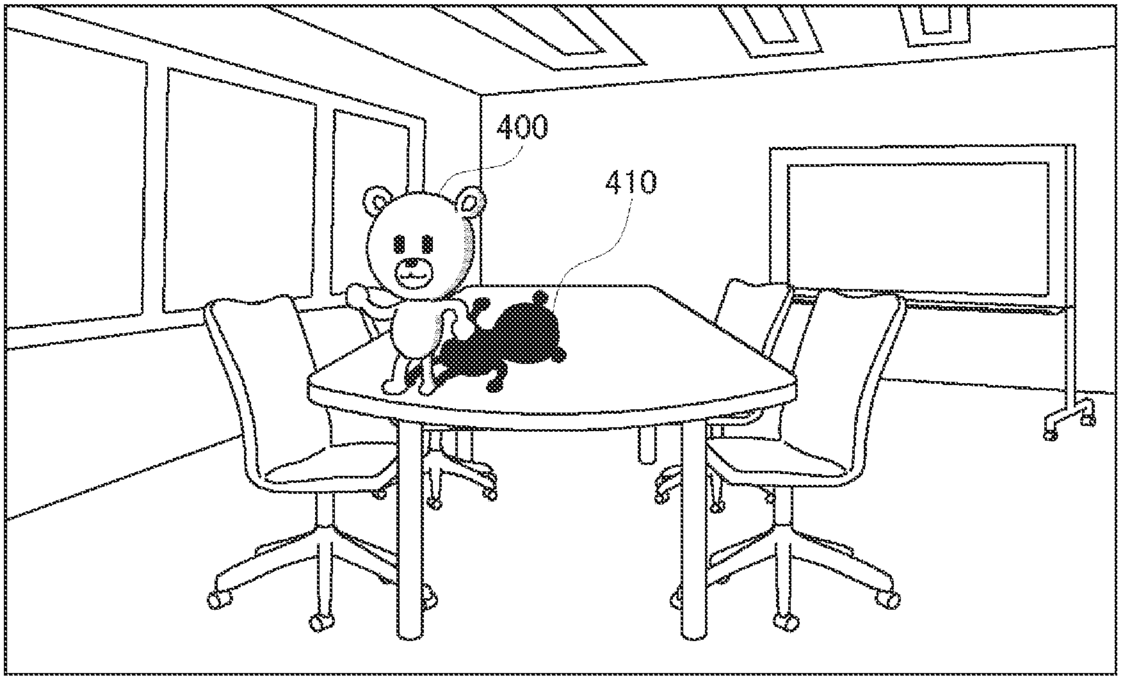
FIG. 5B is a diagram illustrating a manner in which the virtual object 400 is superimposed by the image generation method of the present embodiment on the real space that is made transmissive.

FIG. 5B is a diagram illustrating a manner in which the virtual object 400 is superimposed by the image generation method of the present embodiment on the real space that is made transmissive.

Although the background region other than the shadow 410 is gray and superimposed on the real space, the shadow 410 of the virtual object 400 is black and therefore made transmissive. Because the background region other than the shadow 410 shines weakly, the shadow 410 of the virtual object 400 looks relatively dark. The image generation method of the present embodiment allows representation that makes it look as if the shadow 410 of the virtual object 400 appeared in the real space, which creates a sense of naturalness as if the virtual object 400 existed in the real space, not being detached from the real space.

Figure 6:
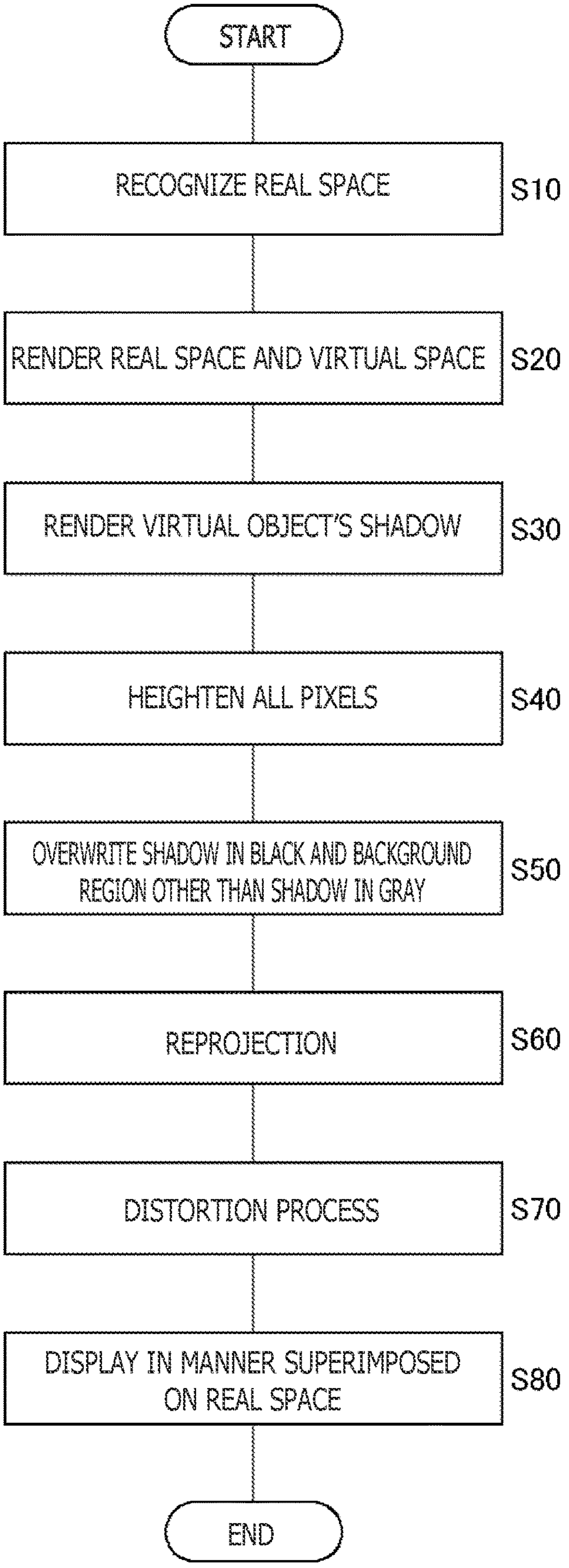
FIG. 6 is a flowchart illustrating an image generation procedure of the present embodiment.

FIG. 6 is a flowchart illustrating an image generation procedure of the present embodiment.

The space recognition section 10 recognizes the real space of the outside world and generates mesh data (S10).

The rendering section 20 renders the mesh of the real space in white and renders a virtual object in the virtual space with a color value (S20). Further, the rendering section 20 renders the virtual object appearing in the mesh in the real space black (S30).

The pixel value conversion section 50 heightens all the pixels resulting from the rendering such that the background color becomes gray (S40). The shadow/background processing section 60 overwrites the shadow in black and overwrites the background region other than the shadow in gray which is the background color (S50).

The reprojection section 70 performs the reprojection process on the image resulting from the rendering (S60). The distortion processing section 80 performs the distortion process on the image that has been subjected to the reprojection process (S70).

The display section 90 displays, in a superimposed manner, the rendered image on the real space that is made transmissive (S80). The background region is displayed slightly brightly, which makes the shadow region that is made transmissive relatively dark. Accordingly, it looks as if a shadow fell on the real space.

A description regarding the image generation apparatus 300 of a second embodiment will next be given. In the second embodiment, the shadow of the virtual object appearing in the real space is represented by rendering light and shadow appearing in the real space from a virtual light source, not uniformly heightening the pixel values of the background region.

Figure 7:
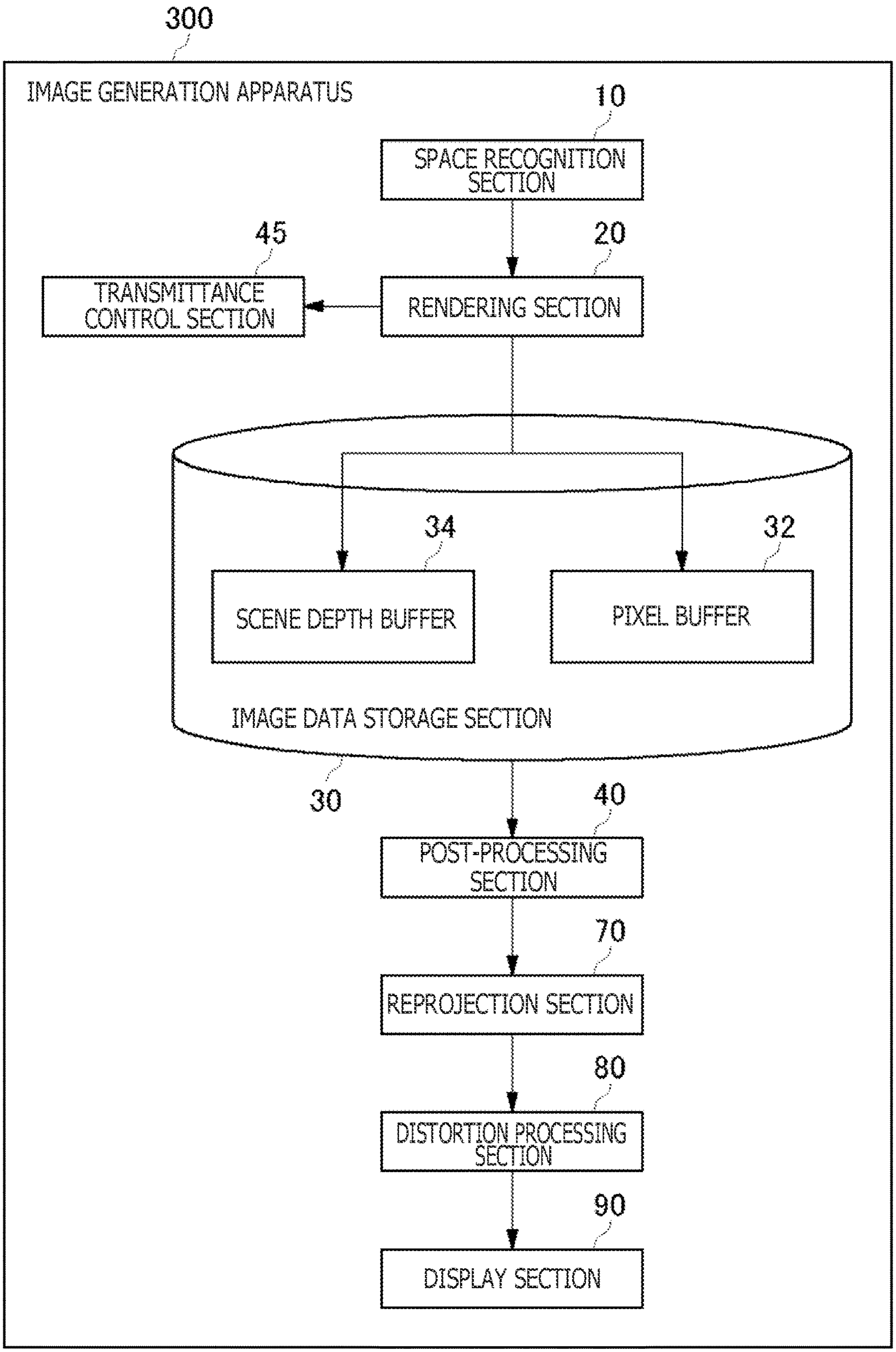
FIG. 7 is a configuration diagram of an image generation apparatus according to a second embodiment.

FIG. 7 is a configuration diagram of the image generation apparatus 300 according to the second embodiment.

The space recognition section 10 recognizes the real space of the outside world, models the real space with a polygon mesh structure, and supplies real-space mesh data to the rendering section 20.

The rendering section 20 renders the shadow of the virtual object appearing in the mesh structure in the real space by rendering not only the virtual object in the virtual space but also the mesh structure in the real space generated by the space recognition section 10, assuming a virtual light source. The virtual light source may be matched with the position of the light source in the real space by light source estimation. In the case of an outdoor light source, for example, the sun's position and the type and brightness of the light source may be determined on the basis of date and time and weather of that location.

More specifically, the rendering section 20 not only renders the virtual object and stores the color value in the pixel buffer 32 but also finds the color value reflecting the manner in which light from the virtual light source strikes the mesh, assuming the color of a material or texture of the mesh in the real space is, for example, dark gray (RGB (10, 10, 10)), and stores the color value in the pixel buffer 32.

Further, the rendering section 20 renders the shadow of the virtual object falling on the mesh structure in the real space, for example, in black (RGB (0, 0, 0)) or in a translucent color having an alpha value set and stores the shadow in the pixel buffer 32.

The final luminance of the shadow need only be determined with reference to the dynamic range of the luminance of the CG image to be output. There can be a case where the final luminance of the shadow is higher than (RGB (10, 10, 10)) and that of a surrounding region of the shadow is even higher, depending on settings such as a light source at a time of rendering. In that case, black level correction may be performed such that the darkest portion of the CG image is equal to (RGB (0, 0, 0)). Also, in a case where the CG image is dark as a whole, there may be a case where, even if the shadow portion is equal to (RGB (0, 0, 0)), the luminance of the surrounding area thereof is only slightly higher. In that case, the entire luminance may be increased by adjusting a tone curve such that the color range of the portion other than the shadow portion is expanded while maintaining the color of the shadow portion unchanged at (RGB (0, 0, 0)).

When rendering a virtual object in the virtual space and a polygon mesh in the real space, the rendering section 20 writes the depth values of these objects to the scene depth buffer 34 and determines the front-to-back relation between the objects.

The post-processing section 40 performs an after-effect process on the CG image resulting from the rendering on the basis of the luminance of the real space that is made transmissive. For example, in a case where the real space is dark, the tone curve of the CG image to be output is adjusted such that the CG image also becomes dark.

The operation of the transmittance control section 45, the reprojection section 70, the distortion processing section 80, and the display section 90 is the same as that in the embodiment, and the description thereof will be omitted here.

According to the image generation apparatus 300 of the second embodiment, the manner in which light from the virtual light source strikes the mesh in the real space is rendered to suit the shape of the mesh, which eliminates the need to heighten all the pixels. Accordingly, it is only necessary to perform rendering in such a manner as to reduce the luminance of the shadow portion lower than the other portions and produce an output. Therefore, the second dimming element 120 is also not necessary in the transmissive head-mounted display 200.

A description has been given above on the basis of embodiments of the present invention. It should be understood by a person skilled in the art that the embodiments are illustrative, that various modification examples are possible in combinations of the components and processes, and that such modification examples also fall under the scope of the present invention.

Although the image generation technology for representing a virtual object's shadow has been described in the above description by citing the transmissive head-mounted display 200 as an example, this image generation technology is not limited to the transmissive head-mounted display 200 and is applicable to transmissive displays in general. For example, it is common to hold a tablet-sized transmissive display against the outside world so as to see a virtual world superimposed on the outside world and install a transmissive display in a space where a real object is present so as to see the virtual world superimposed on the real object on the other side through the transmissive display. It is possible to represent a virtual object's shadow by applying the image generation technology of the present invention not only to head-mounted displays worn at the eyepiece position but also to transmissive displays seen from a remote position.

INDUSTRIAL APPLICABILITY

The present invention is applicable to image generation technology.

REFERENCE SIGNS LIST

10: Space recognition section
20: Rendering section
30: Image data storage section
32: Pixel buffer
34: Scene depth buffer
36: Real space depth buffer
40: Post-processing section
45: Transmittance control section
50: Pixel value conversion section
60: Shadow/background processing section
70: Reprojection section
80: Distortion processing section
90: Display section
100: Transmissive display
110: First dimming element
120: Second dimming element
130: Viewpoint
200: Transmissive head-mounted display
300: Image generation apparatus

The invention claimed is:

1. An image generation apparatus that generates an image to be displayed on a transmissive display, the image generation apparatus comprising:

circuitry configured to generate, when generating an image to be superimposed on a real space, an image whose background region on which a virtual object appearing in the real space is not superimposed is drawn in a background color having a predetermined luminance so as to make a region of a shadow of the virtual object look relatively dark; and a rendering section adapted to render the background region in a background color reflecting light from a virtual light source striking a mesh structure by rendering not only the virtual object but also the mesh structure in the real space, assuming the virtual light source, to render the shadow of the virtual object appearing in the mesh structure in the real space.

2. The image generation apparatus according to claim 1, wherein the rendering section is further adapted to render the shadow of the virtual object appearing in the mesh structure in the real space by rendering not only the virtual object but also the mesh structure in the real space;

the image generation apparatus further comprises a pixel value conversion section adapted to heighten colors of all pixels such that the background region uniformly takes on a background color having a predetermined luminance; and the image generation apparatus further comprises a shadow/background processing section adapted to identify the region of the shadow of the virtual object, set a background region other than the shadow to the background color, and set the region of the shadow to a color whose luminance is equal to or lower than that of the background color.

3. The image generation apparatus according to claim 2, further comprising: a transmittance control section adapted to make an adjustment to reduce a transmittance of a dimming element provided on a front side of the transmissive display according to the heightening of the colors of all the pixels.

4. The image generation apparatus according to claim 3, wherein, to suit the transmittance of the dimming element provided on the front side of the transmissive display, a transmittance of another dimming element provided on an outer side of the transmissive display is adjusted.

5. The image generation apparatus according to claim 1, further comprising: a post-processing section adapted to adjust a tone curve of a rendered image on a basis of a dynamic range of a luminance of the rendered image in whole or a luminance of the real space.

6. An image generation method that generates an image to be displayed on a transmissive display, the method comprising:

generating, when generating an image to be superimposed on a real space, an image whose background region on which a virtual object appearing in the real space is not superimposed is drawn in a background color having a predetermined luminance so as to make a region of a shadow of the virtual object look relatively dark; and rendering the background region in a background color reflecting light from a virtual light source striking a mesh structure by rendering not only the virtual object but also the mesh structure in the real space, assuming the virtual light source, to render the shadow of the virtual object appearing in the mesh structure in the real space.

7. A non-transitory, computer readable storage medium containing a computer program, which when executed by a computer, causes the computer to perform a process for generating an image to be displayed on a transmissive display, by carrying out actions, comprising:

generating, when generating an image to be superimposed on a real space, an image whose background region on which a virtual object appearing in the real space is not superimposed is drawn in a background color having a predetermined luminance so as to make a region of a shadow of the virtual object look relatively dark; and rendering the background region in a background color reflecting light from a virtual light source striking a mesh structure by rendering not only the virtual object but also the mesh structure in the real space, assuming the virtual light source, to render the shadow of the virtual object appearing in the mesh structure in the real space.

* * * * *